United States Patent
Chitwood et al.

(10) Patent No.: US 9,464,880 B2
(45) Date of Patent: Oct. 11, 2016

(54) DUAL WIRE DYNAMIC PROXIMITY TRANSDUCER INTERFACE FOR USE IN PROXIMITY TRANSDUCER SYSTEM AND PROXIMITY TRANSDUCER SYSTEM INCLUDING THE SAME

(75) Inventors: Randall Richard Chitwood, Minden, NV (US); Christine Borgfeld, Alvin, TX (US); David Dobsky, Houston, TX (US)

(73) Assignee: Metrix Instrument Co., LP, Houston, TX (US)

( * ) Notice: Subject to any disclaimer, the term of this patent is extended or adjusted under 35 U.S.C. 154(b) by 1484 days.

(21) Appl. No.: 12/836,965

(22) Filed: Jul. 15, 2010

(65) Prior Publication Data

US 2012/0013328 A1   Jan. 19, 2012

(51) Int. Cl.
   *G01B 7/02*   (2006.01)
(52) U.S. Cl.
   CPC .................................. *G01B 7/023* (2013.01)
(58) Field of Classification Search
   CPC ..................................................... G01B 7/023
   USPC ............ 324/207.11, 207.12, 207.15, 207.26, 324/207.25
   See application file for complete search history.

(56) References Cited

U.S. PATENT DOCUMENTS

| | | |
|---|---|---|
| 5,229,653 A | 7/1993 | Lamarche |
| 6,437,581 B1 * | 8/2002 | Blossfeld ..................... 324/600 |
| 6,759,855 B2 | 7/2004 | Frauscher |
| 2008/0054891 A1 | 3/2008 | Dobsky |

FOREIGN PATENT DOCUMENTS

| | | |
|---|---|---|
| CN | 201429406 Y | 3/2010 |
| JP | 07152989 A | 6/1995 |

OTHER PUBLICATIONS

International Search Report for PCT/US2011/042969 mailed on Oct. 17, 2011.

* cited by examiner

*Primary Examiner* — Tung X Nguyen
*Assistant Examiner* — Feba Pothen
(74) *Attorney, Agent, or Firm* — Hoffmann & Baron, LLP

(57) ABSTRACT

A proximity transducer system including an eddy current effect proximity probe, a proximity electronics module coupled to the probe, a monitoring system and a two-wire, current interface connecting the proximity electronics module to the monitoring system is disclosed. The proximity transducer system is operative for measuring position and vibration of a component to be monitored. The current interface is made up of a pair of wires, e.g., a twisted pair, and is adapted for providing power to the electronics module and an electrical signal from the proximity electronics module that is representative of (e.g., proportional to) the length of the gap between the probe and the component being monitored. That signal has a DC component that represents a steady state distance and an AC component that represents active movement of the component, such as vibration.

20 Claims, 3 Drawing Sheets

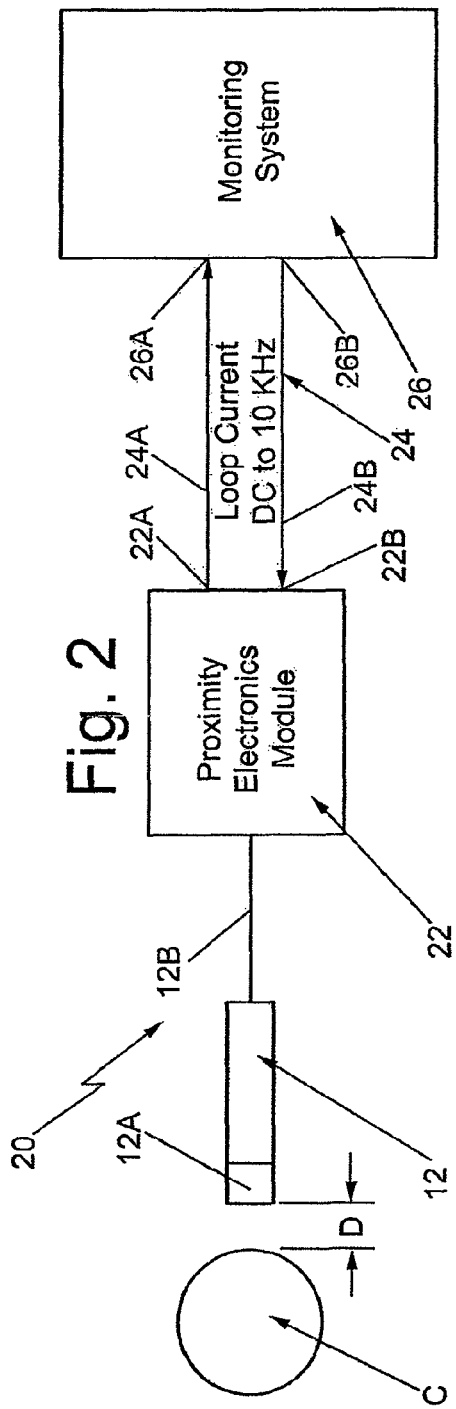
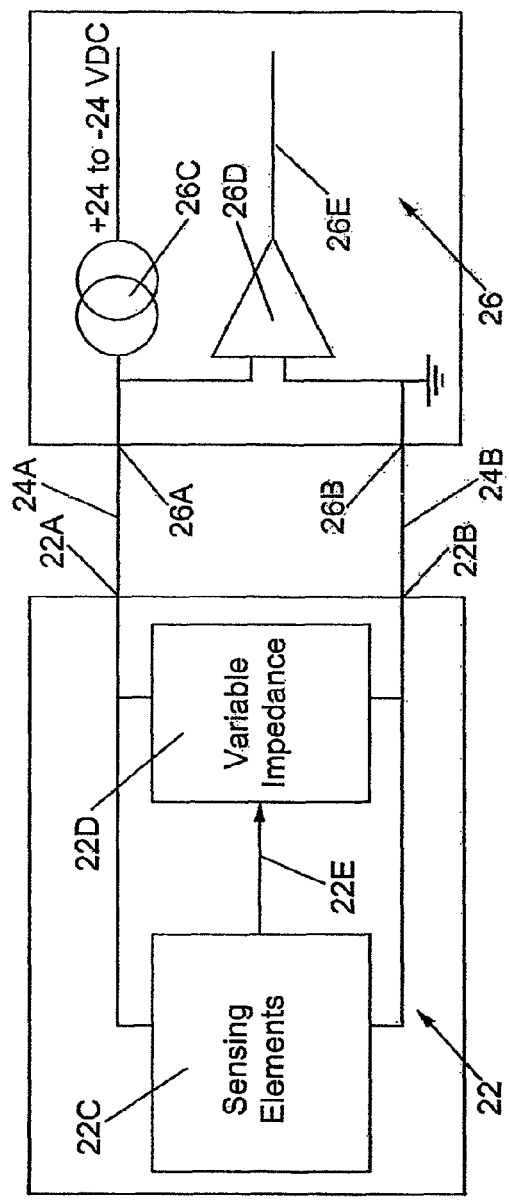

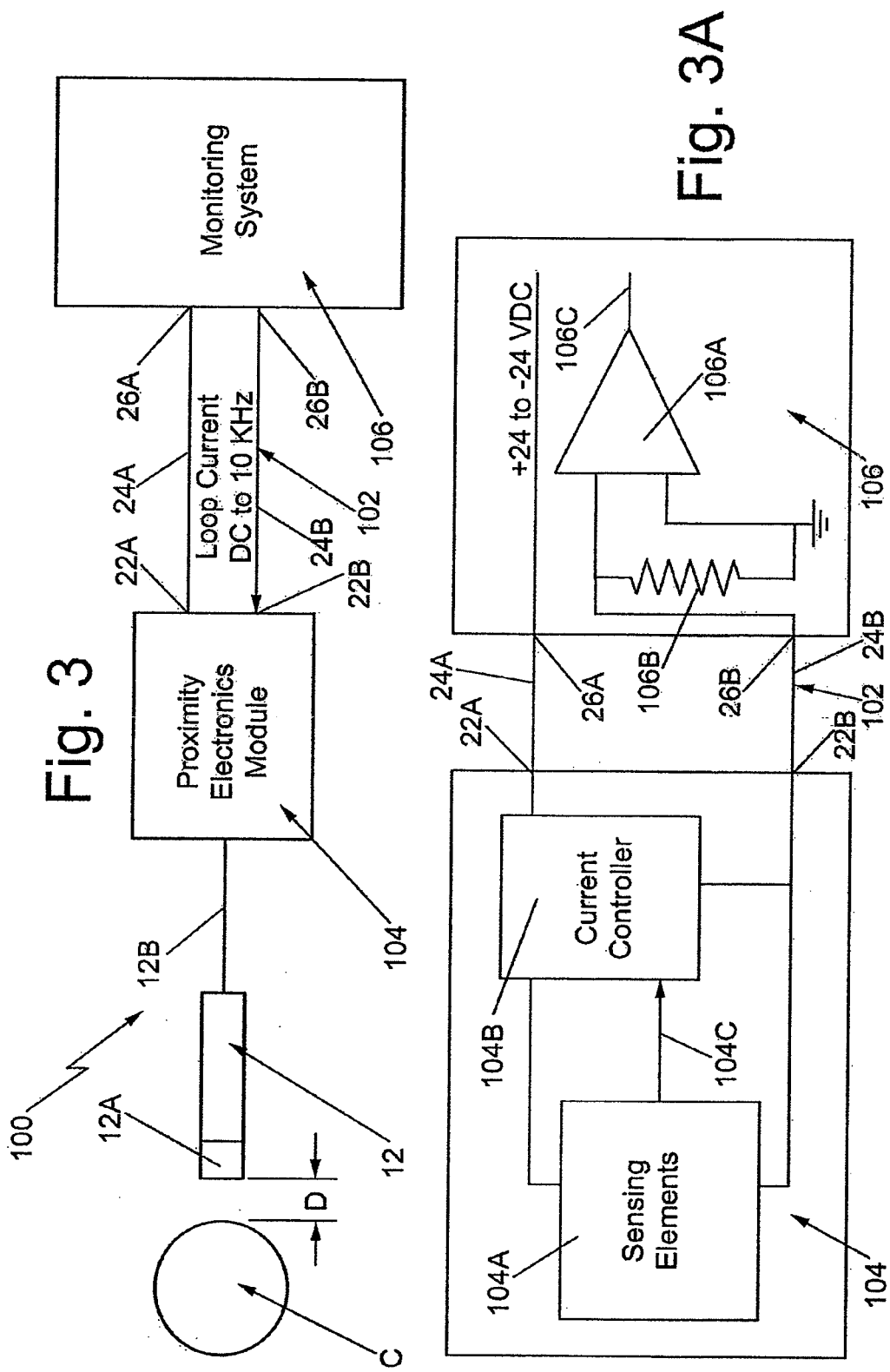

DUAL WIRE DYNAMIC PROXIMITY TRANSDUCER INTERFACE FOR USE IN PROXIMITY TRANSDUCER SYSTEM AND PROXIMITY TRANSDUCER SYSTEM INCLUDING THE SAME

CROSS-REFERENCE TO RELATED APPLICATIONS

"Not Applicable"

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates to generally to proximity transducer systems and particularly to non-contact transducer based proximity systems including a proximity electronics module, a monitoring system, and a two-wire current interface coupling the proximity electronics module to the monitoring system.

BACKGROUND OF THE INVENTION

For the past fifty years proximity transducer systems based on the eddy current effect have dominated the measurement of vibration and shaft position in machines with fluid film bearings. These systems convert the physical distance from a probe to a metal target into a voltage proportional to that physical distance. A proximity transducer system has by its nature a frequency response from DC (static distance) to about 10 Khz of AC or (dynamic distance). This allows these sensors to be useful for measuring static (DC) distances such as the position of a shaft relative to a thrust bearing and the dynamic AC movement of a machine shaft (e.g., vibration). Proximity transducer systems are also used for measuring the dynamic position of rods, pistons or other and mechanically moving parts on reciprocating machines. When a proximity transducer system is mounted to a fixed part of a machine observing the rotating shaft the AC component of the output is proportional to vibration of the shaft relative to the machine case or bearing. This direct vibration measurement has become the industry standard.

Typical proximity transducer systems consist of a probe tip located within a probe body, a separate electronics module, a monitoring system, and an interface cable connecting the electronics module to the monitoring system. The probe tip typically contains a coil of wire that is located within the probe body and arranged to be placed in close proximity of the component to be observed (e.g., a machine shaft or thrust collar). The probe body not only supports the sensing tip, but also allows setting the static distance from the tip to the target. The material making up the target has to be metal for the eddy current effect to be realized. A coaxial cable may be provided for connecting the probe tip's wire coil to the electronics module when a separate electronics module is used. If the probe is an integral one, i.e., the probe contains the electronics, a separate electronics module is unnecessary, as is a coaxial cable. In any case the electronics module contains electronics for driving (powering) the probe tip and for converting the output signal from the probe, i.e., the measured distance, to a linear voltage signal which is represented in volts/distance units. The interface cable serves to connect the proximity electronics module to the monitoring system is typically a three-wire twisted shielded cable. The monitoring system can take various forms, e.g., it may be designed to protect machines, provide current values, alarms, diagnostic information, or many other uses. In all case, the monitoring system provides power to the proximity transducer system and accepts the signal from the proximity transducer system. This signal is then analyzed for various useful attributes such as overall vibration, vibration waveforms, vibration spectrums, vibration phase and amplitude, thrust position, compressor rod position, compressor piston position and so forth. The monitoring system may be custom made, built of existing systems such as PLCs, machine unit controllers, computer DAQ functions or any number of realizations.

As should be appreciated by those skilled in the art, the three-wire cables used in the foregoing proximity transducer systems have a number of drawbacks. For example, each channel requires a shielded three-wire twisted cable. Three-wire cables are not as common as shielded two wire cables and are more expensive. Moreover, three wire cables exhibit significant cable bulk, requiring a larger conduit. Further still, the voltage interface used in the current interface is typically terminated with a 10K ohm load resistor. This makes the internal signals, power, signal and common, susceptible to conducted EMI. Unwanted conducted currents entering the system will generate voltage across a relatively large load resistor. Because the interface is not differential, this voltage can create error signals that can cause significant performance issues with the monitoring system up to and including creation of false alarms. Furthermore, in potentially explosive or hazardous applications where proximity transducer systems are used, such systems commonly incorporate the use of a zener diode as a safety barrier between the monitoring system and the proximity electronics module. Such an arrangement with conventional three-wire voltage based systems results in a reduced linear range and a decreased scale factor.

Thus, a need exists for a cable connection between the probe electronics module (connected by coax or integral) and the monitoring system (or equivalent) which overcomes those disadvantages.

The subject invention addresses that need. To that end, this invention targets the electrical design and properties of the cable connection and reduces the number of connection wires from three to two. In addition it changes the mode of the analog interface from single ended voltage to a current loop, which provides both the dynamic signal transmission and power for the proximity transducer.

SUMMARY OF THE INVENTION

In accordance with one aspect of the invention there is provided a two wire-current interface for use in a proximity transducer system. In accordance with another aspect of this invention a proximity transducer system making use of such an interface is provided.

The proximity transducer system basically comprises a non-contacting proximity probe (e.g., an eddy current effect based proximity detecting probe), a proximity electronics module coupled to the probe and a monitoring system for measurement of position and vibration of a component to be monitored. The probe is arranged to measure the distance (i.e., length of the gap) between itself and the component being monitored The two wire-current interface basically comprises a pair of wires providing power from the monitoring system to the proximity electronics module. The current interface is also adapted for providing an electrical signal from the proximity electronics module which is representative of (e.g., proportional to) the instantaneous value of the length of the gap (e.g., the signal has a DC component that is indicative of the steady-state position of the component monitored, and an AC component that is indicative of the vibration of the component monitored).

In accordance with one exemplary aspect of this invention the monitoring system delivers a constant current to the proximity electronics via the current interface and the proximity electronics module includes a variable impedance that changes impedance proportional to the distance of the probe from the monitored component.

In accordance with another exemplary aspect of this invention a small resistor is connected to the current interface and the monitoring system delivers a constant voltage through the small resistor to the proximity electronics module. In such a case the proximity electronics module includes a current source that modulates the current it consumes proportional to the distance of the probe from the monitored component.

DESCRIPTION OF THE DRAWING

FIG. 2 is a schematic diagram of one exemplary proximity transducer system constructed in accordance with this invention making use of a two-wire current interface;

FIG. 2A is a schematic diagram of a portion of the exemplary transducer system shown in FIG. 2;

FIG. 3 is a schematic diagram of another exemplary proximity transducer system constructed in accordance with this invention making use of a two-wire current interface; and FIG. 3A is a schematic diagram of a portion of the exemplary transducer system shown in FIG. 3.

DETAILED DESCRIPTION OF THE PREFERRED EMBODIMENT

Figure 1:
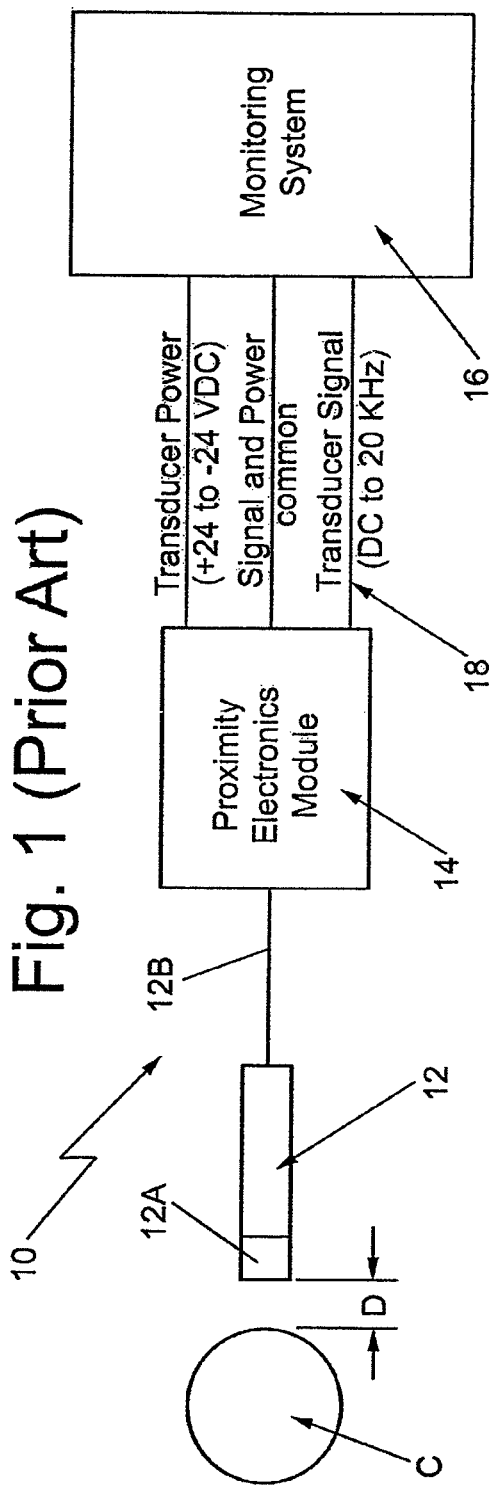
FIG. 1 is a schematic diagram of an exemplary prior art proximity transducer system.

Referring now to the various figures of the drawing wherein like reference characters refer to like parts, there is shown in FIG. 1 a conventional prior art proximity transducer system 10 making use of a three-wire cable interface. The system 10 basically comprises an eddy current based proximity probe 12, a proximity electronics module 14, a monitoring system 16, and a three-wire interface cable 18 interconnecting the electronics module and the monitoring system 16. The probe 12 is any conventional device, such as those sold by General Electric, Bently Nevada™, under the trademark Proximitor® and includes a probe tip 12A in which a coil (not shown) is disposed.

The electronics module 14 is any conventional device, such as those sold by General Electric, Bently Nevada™, under the trademark Proximitor® The probe 12 is connected to the electronics module via a conventional coaxial extension cable 12B. As mentioned earlier, the electronics module may be integral with the probe 12. In such a case no cable 12A is necessary. An example of a commercially available integrated probe and electronics module is the IN series sold by Brüel & Kjær Vibro.

The probe tip 12A is arranged to be placed in close proximity of the component C (e.g., a machine shaft, thrust collar, etc.), to observed/monitored. Thus, the probe body not only supports the tip 12A, but also allows setting the static distance (i.e., the length of the gap) from the probe tip to the target C. The proximity electronics module 14 contains the electronics for powering the probe tip 12A and for converting the output signal from the probe 12, i.e., the measured distance, to a linear voltage signal which is provided via the cable 18 to the monitoring system 16. To that end the cable 18 is a conventional three-wire cable. As can be seen in FIG. 1, one of its three conductors provides +24 VDC to −24 VDC power to the proximity electronics module 14. Another of its three conductors also provides power (e.g., it serves as the common or ground) for the proximity electronics module, while also being the ground for the transducer signal (e.g., DC to 20 KHz), while the last of its three conductors also carries the transducer signal. That transducer signal is indicative of the distance D (both static distance and dynamic distance).

In FIG. 2 there is shown one exemplary proximity transducer system 20 which overcomes the disadvantages of the prior art by making use of a two-wire, current interface constructed in accordance with one exemplary aspect of this invention. The system 20 is identical to the system 10, except for the proximity electronics module 22, the interface 24 and the monitoring system 26. In the interest of brevity, those components which are common to systems 10 and 20 will be given the same reference numbers and the details of their construction and operation will not be reiterated. Thus, the system 20 comprises an eddy current based proximity probe 12, a proximity electronics module 22, the monitoring system 26, and the interface 24. It should be pointed out at this juncture that other non-contacting type proximity probes (e.g., inductive or capacitive based devices), can be used in lieu of an eddy current based probe described heretofore. The interface 24 interconnects the proximity electronics module 22 and the monitoring system 26 and is in the form of a twisted, two-wire 24A and 24B cable for carrying loop current in the range of DC to 10 KHz. The cable can be of any desired length, e.g., from a few meters to up to about a 1000 meters. As is well known, current loops operating in the range of 4 to 20 mA have been used in the prior art for other applications to communicate measured parameters. They have not been used for transmitting a dynamic proximity transducer signal which is proportional to the actual physical gap voltage, without any position offset or peak detection to the signal prior to transmission. Moreover, 4 to 20 mA current loops having a bandwidth from DC to 10 KHz have not been used to provide power to the sensing transducer.

Since the proximity electronics module 22 is connected to the monitoring system 26 by the two wires 24A and 24B of the cable, instead of the prior art three-wire cable, the proximity electronics module 22 is modified slightly from a conventional one (like that shown in FIG. 1) to form a portion of the current interface of this invention. The modifications to the proximity electronics module are best seen in FIG. 2A and will be described later. The monitoring system 26 is also modified slightly from a conventional monitoring system 16 (shown in FIG. 1). The modifications to the monitoring system 26 are best seen in FIG. 3A and will also be described later. The proximity electronics module includes a pair of input/output terminals-22A and 22B for connection to respective wires 24A and 24B of the interface cable. In a similar manner the monitoring system 26 includes a pair of input/output terminals 26A and 26B for connection to respective wires 24A and 24B of the interface cable.

As should be appreciated by those skilled in the art from the drawings and the description to follow, the current interface 24 of the embodiment of FIG. 2 is arranged so that the monitoring system 26 delivers a constant current to the proximity electronics module 22 via the monitoring system's input/output terminals 26A and 26B. The electronics of the proximity electronics module 22 includes a variable impedance that changes the voltage at the monitoring system's constant current output terminals 26A and 26B. The impedance of the proximity electronic module is proportional to distance D to the target to be monitored, so that the monitoring system 26 will measure a voltage created by the constant current and the variable impedance established by proximity electronics module. Thus, that voltage will be proportional to distance (static and dynamic). Moreover, the monitoring system 26 is arranged to detect a properly connected proximity electronics module 22 and proper distance to the observed target C by verifying that the measured voltage is within a specified voltage window.

The modification to the electronics of the proximity electronics module 22 is best seen in FIG. 2A. To that end, the proximity electronics module includes sensing elements 22C and a variable impedance 22D having a control input provided via line 22E. The input/output terminals 22A and 22B of the proximity electronics module 22 are connected across the variable impedance. The modification to the electronics of the monitoring system 26 is best seen in FIG. 3A. To that end, it includes a current source 26C and an associated operational amplifier 26D. One side of the current source is connected to the common junction of the input/output terminal 26A and one input of the operational amplifier. The other side of the current source is connected to a +24 to −24 VDC loop supply. The other input of the operational amplifier is connected to the common junction of the input/output terminal 26B and ground. The other components and circuitry making up the monitoring system 26 (as well as the other components of the proximity electronics module 22) are conventional and have not been shown and will not be described in the interest of brevity since they are conventional.

The proximity electronics module 22 is arranged so that its sensing elements 22C use some amount of current from the current source 26C of the monitoring system 26 to power its circuits. The sensors provide a signal on line 22E which controls the variable impedance 22D to make the voltage between the terminals 26A and 26B proportional to the probe distance D to the target C. Accordingly, the output signal from the operational amplifier 26D, which is provided on line 26E, is a voltage which is proportional to the distance D sensed by the probe's tip.

In FIG. 3 there is shown one exemplary proximity transducer system 100 which overcomes the disadvantages of the prior art by making use of a two-wire, current interface constructed in accordance with another exemplary aspect of this invention. The system 100 is identical to the system 20, except for the interface, the proximity electronics module and the monitoring system. In the interest of brevity, those components which are common to systems 20 and 100 will be given the same reference numbers and the details of their construction and operation will not be reiterated. The system 100 comprises an eddy-current based proximity probe 12, a proximity electronics module 104, a monitoring system 106 and a current interface 102.

The interface 102 also comprises a twisted two-wire 24A and 24B cable (like that of embodiment 20) for carrying loop current in the range of DC to 10 KHz. The interface 102 makes use of a small resistor, in the monitoring system 106 to create a constant voltage source. In particular, as best seen in FIG. 3A the monitoring system 106 has been modified from a conventional monitoring system (like shown in FIG. 1) to include an operational amplifier 106A and a typical resistance of 250 ohm, resistor 106B, although the resistance could be anywhere between 0.1 to 100K ohm depending the system design, including factors such as current loop current value and the design of the front end signal conditioning electronics. One side of the resistor 106B is connected to one of the inputs of the operational amplifier 106A and to terminal 26B. The other side of the resistor 106B is connected to the common junction of the other input to the operational amplifier 106A and ground. The output of the operational amplifier is provided on line 106C. Terminal 26A is connected to the +24 to −24 VDC loop supply.

When constructed as just described, the proximity electronics module 104 creates a current source that modulates the current it consumes proportional to the distance to the target C. The modulated current produces a voltage on the proximity electronics module's side of the resistor 106B that is proportional to distance D (static and dynamic) to the target C being observed. In particular, the monitoring system 106 delivers a constant voltage on one wire 24A of the cable, with the other wire 24B of the cable being connected to ground through the resistor 106B. The proximity electronics module 104 is arranged so that the sensing elements 104A use some amount of current from the current controller 104B to power its circuits. The sensors provide a signal on line 104C, which controls the current controller 104B to make the current at the output terminals proportional to the distance D. The current controller 104B maintains the current at those terminals proportional to input from sensing elements. Since the operational amplifier of the monitoring system is connected between the terminals 26A and 26B, its output as provided on line 106C is thus indicative of the distance D (static and dynamic) to the target C being observed. Moreover, the monitoring system 106 detects the proper connection of the proximity electronics module 104 and the proper distance to the observed target C by verifying that the loop current is within the specified limits, e.g., 4-20 mA, for proper operation, with current less than approximately 3.5 mA indicating a fault value. However, the current loop magnitude for a proportional amount of current versus gap distance could be set at any convenient value depending on design constraints. The fault current would be a current outside of the allowable linear design range of the gap distance.

As should be appreciated from the foregoing, the subject invention offers considerable advantages over prior art systems making use of three-wire interface cables. In particular, two-wire twisted shielded pairs are less expensive than equivalent three-wire cables. Only two wires must be terminated per channel. Two wires provide both transmission of the eddy current distance measurement from DC to 10 KHz and the power to operate the electronics in the proximity transducer. The proximity electronics can be made immune to the polarity of the connection, the system cannot be miswired. Moreover, the proximity transducer system making use of this invention should be significantly less susceptible to EMI and RFI (e.g., at least 40 times less). The primary reason for this is the monitoring system has only a 250 ohm terminating resistor compared to the prior art's current solution of 10K ohm. The cable bundles themselves will be approximately ⅓ less thick, thereby permitting fitting in smaller conduit and simplifying panel wiring and the monitoring system can accept more channels on a fixed amount of connector space. Moreover, retrofit installations can use existing twisted pairs, which are much more common. Lastly, the use of safety barriers for explosive or hazardous area applications with this invention will not result in a scale factor change or adversely affect total system range.

While the invention has been described in detail and with reference to specific examples thereof, it will be apparent to one skilled in the art that various changes and modifications can be made therein without departing from the spirit and scope thereof and thus others may, by applying current or future knowledge, adopt the same for use under various conditions of service.

We claim:

1. A two-wire current interface for use in a proximity transducer system comprising a proximity probe, a proximity electronics module coupled to the probe, and a monitoring system for measurement of position and vibration of a component to be monitored by determining the length of the gap between the probe and the component to be monitored, the two wire-current interface comprising a pair of wires providing power from the monitoring system to the proximity electronics module, the proximity electronics module being coupled to the monitoring system by said two-wire current interface for providing a non-processed electrical signal to the monitoring system, said non-processed electrical signal being representative of the instantaneous value of the length of the gap.

2. The two-wire current interface of claim 1 wherein the monitoring system delivers a constant current to the proximity electronics module via said current interface, and wherein the proximity electronics module comprises a variable impedance that changes impedance proportional to the length of the gap.

3. The two-wire current interface of claim 1 additionally comprising a resistor connected to said current interface, wherein the monitoring system delivers a constant voltage through said resistor to the proximity electronics module, and wherein the proximity electronics module includes a current source that modulates the current it consumes proportional to the length of the gap.

4. The two-wire current interface of claim 1 wherein said current interface comprises a twisted pair of electrical conductors.

5. The two-wire current interface of claim 2 wherein said current interface comprises a twisted pair of electrical conductors.

6. The two-wire current interface of claim 3 wherein said current interface comprises a twisted pair of electrical conductors.

7. A proximity transducer system for measurement of position and vibration of a component to be monitored, said system comprising a proximity probe, a proximity electronics module, a monitoring system for measurement of the position and vibration of a component to be monitored by determining the distance of the gap between the probe and the component to be monitored, and a two-wire current interface, said electronics module being coupled to said probe, said current interface comprising a pair of wires providing power from said monitoring system to said proximity electronics module, said proximity electronics module being coupled to said monitoring system by said two-wire current interface for providing a non-processed electrical signal to said monitoring system, said non-processed electrical signal being representative of the instantaneous value of the length of the gap.

8. The proximity transducer system of claim 7 wherein the monitoring system delivers a constant current to the proximity electronics module via said current interface, and wherein the proximity electronics module comprises a variable impedance that changes impedance proportional to the length of the gap.

9. The proximity transducer system of claim 7 additionally comprising a resistor connected to said current interface, wherein said monitoring system delivers a constant voltage through said resistor to said proximity electronics module, and wherein said proximity electronics module includes a current source that modulates the current it consumes proportional to the length of the gap.

10. The proximity transducer system of claim 7 wherein said current interface comprises a twisted pair of electrical conductors.

11. The proximity transducer system of claim 8 wherein said current interface comprises a twisted pair of electrical conductors.

12. The proximity transducer system of claim 9 wherein said current interface comprises a twisted pair of electrical conductors.

13. The proximity transducer system of claim 7 wherein said electrical signal is in the range of DC to approximately 10 KHz AC.

14. The proximity transducer system of claim 8 wherein said electrical signal is in the range of DC to approximately 10 KHz AC.

15. The proximity transducer system of claim 9 wherein said electrical signal is in the range of DC to approximately 10 KHz AC.

16. The proximity transducer system of claim 3 wherein said monitoring system delivers a constant current is in the range of 4 to 20 mA to said resistor.

17. The proximity transducer system of claim 9 wherein said monitoring system delivers a constant current is in the range of 4 to 20 mA to said resistor.

18. The proximity transducer system of claim 7 wherein said proximity probe comprises an eddy current based device.

19. The proximity transducer system of claim 8 wherein said proximity probe comprises an eddy current based device.

20. The proximity transducer system of claim 9 wherein said proximity probe comprises an eddy current based device.

* * * * *